United States Patent [19]

Rabatin

[11] 4,360,571

[45] Nov. 23, 1982

[54] X-RAY INTENSIFYING SCREEN

[75] Inventor: Jacob G. Rabatin, Chardon, Ohio

[73] Assignee: General Electric Company, Schenectady, N.Y.

[21] Appl. No.: 951,463

[22] Filed: Oct. 16, 1978

Related U.S. Application Data

[63] Continuation-in-part of Ser. No. 826,405, Aug. 22, 1977, abandoned.

[51] Int. Cl.$^3$ ........................ C09K 11/475; G01T 1/00

[52] U.S. Cl. ................................ 428/691; 252/301.36; 252/301.4 H; 250/483.1; 423/268; 428/403; 428/411; 428/697; 428/702; 428/913

[58] Field of Search .................... 252/301.4 H, 301.36; 423/267, 268; 427/64, 65, 71, 157, 160, 215; 428/403, 539, 411, 691, 697, 702, 913; 250/483

[56] References Cited

U.S. PATENT DOCUMENTS

| | | | |
|---|---|---|---|
| 2,155,499 | 4/1939 | Lawson | 427/215 X |
| 2,162,690 | 6/1939 | Anderson | 427/215 X |
| 2,389,781 | 11/1945 | Isenberg | 252/301.36 |
| 2,421,208 | 5/1947 | Leverenz | 252/301.4 H X |
| 2,436,182 | 1/1948 | Schmidling | 252/301.36 X |
| 2,664,357 | 12/1953 | Miller | 423/267 X |
| 3,023,313 | 2/1962 | De La Mater et al. | 427/65 X |
| 3,070,435 | 12/1962 | Reusser et al. | 423/267 |
| 3,227,656 | 1/1966 | Jeffreys | 252/301.36 X |
| 3,617,743 | 11/1971 | Rabatin et al. | 252/301.4 H X |
| 3,795,814 | 3/1974 | Rabatin | 252/301.4 H X |
| 4,138,361 | 2/1979 | Suys et al. | 252/301.4 H X |

FOREIGN PATENT DOCUMENTS

| | | | |
|---|---|---|---|
| 904538 | 7/1972 | Canada | 423/267 |
| 999780 | 7/1965 | United Kingdom | 427/64 |

*Primary Examiner*—Jack Cooper
*Attorney, Agent, or Firm*—John F. McDevitt

[57] ABSTRACT

Improved performance of rare earth oxyhalide phosphors in x-ray image intensifying screens may be realized by admixing a small but effective amount of certain fatty acids and fatty acid derivative with the phosphor prior to the preparation of the screen. Alternately, the phosphor powder can be washed with a liquid dispersion or solution of said additives as an equivalent means of providing improved moisture resistance as well as preserving the original emission brightness of the adhesively bonded material when used in x-ray screens.

2 Claims, 1 Drawing Figure

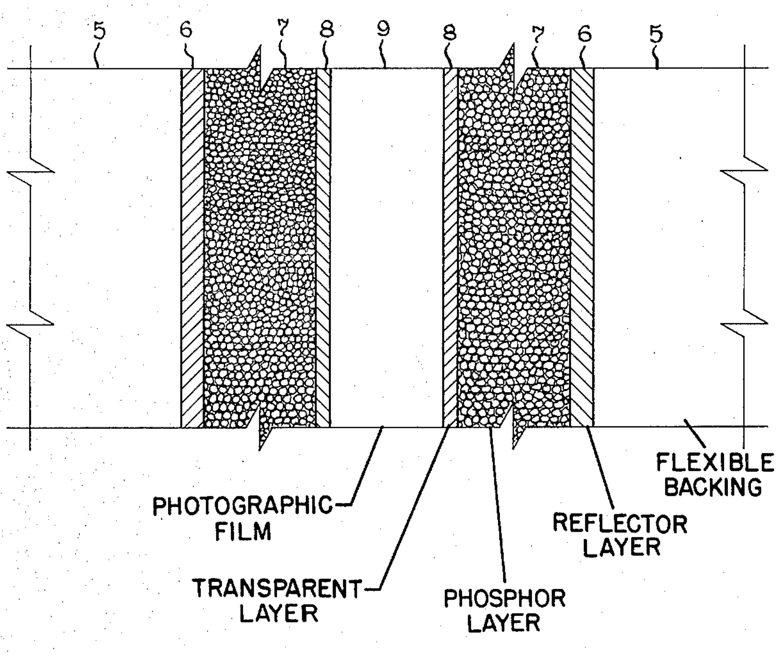
5
6
7
8
9
8
7
6
5
PHOTOGRAPHIC FILM
TRANSPARENT LAYER
PHOSPHOR LAYER
REFLECTOR LAYER
FLEXIBLE BACKING

X-RAY INTENSIFYING SCREEN

This application is a continuation-in-part of my application Ser. No. 826,405, filed Aug. 22, 1977, and now abandoned.

RELATED PATENT APPLICATION

In my co-pending patent application, Ser. No. 749,996, filed Dec. 13, 1976, and assigned to the present assignee, there is described and claimed a particular class of inorganic salt additives for improving the emission brightness of rare earth oxyhalide phosphors when used in x-ray screens. A continuation-in-part, application Ser. No. 951,464, filed Oct. 16, 1978, upon said application further describes the improvements obtained.

BRIEF DESCRIPTION OF THE PRIOR ART

Rare earth oxyhalides have been employed as phosphors for x-ray image converters for some time. The structure of a multi-layer intensifier screen utilizing such phosphors is disclosed in U.S. Pat. No. 3,936,644 to the present inventor. A process for producing rare earth oxyhalides is disclosed in U.S. Pat. No. 3,591,516, also to the present inventor. Various x-ray image converter devices utilizing rare earth oxyhalide phosphors are disclosed and claimed in further U.S. Pat. Nos. 3,617,743 and 3,795,814 of the present inventor. In this mentioned prior art, oxyhalides of lanthanum and gadolinium are disclosed in conjunction with phosphor activating elements. Two specific phosphors commercially available are LaOB:Tb and LaOBr:Tm. In normal environmental situations, special moisture reducing provisions need not be implemented to protect the phosphor component of an x-ray image converter device. However, in humid climates, moisture has a deleterious effect on the phosphor material so that special environmental controls, such as air conditioning and dehumidification are necessary in places where such devices as x-ray screen are stored, used and processed. As will be appreciated, in many places such rigorous environmental control is not possible. Accordingly, it is desirable to prepare the phosphor material itself to be moisture resistant.

An entirely different problem is encountered during use of said x-ray image intensifier screens and which is attributable to discoloration of the phosphor layer by volatile organic constituents escaping from the associated photographic film. Specifically, the photographic film that is customarily positioned next to the phosphor layer in said screen construction includes volatile organic compounds which migrate into the screen and discolor in the polymer binder of the phosphor layer. Such interraction reduces the film speed significantly in as short a time duration as a few days and can thereby represent a more serious performance problem than experienced from phosphor brightness loss attributable to moisture attack. Understandably, these problems are of a different nature since moisture attack produces degradation of the phosphor material itself whereas the discoloration in the phosphor layer produced by volatilized photographic film constituents is limited to discoloration with no loss of phosphor efficiency.

It would be further desirable, therefore, to solve both of said problems in a convenient and effective manner which does not involve an elaborate modification of the present type x-ray screen constrictions.

SUMMARY OF THE INVENTION

In the present invention, additives are incorporated into a rare earth oxyhalide phosphor powder prior to the preparation of the x-ray image converter device. The additives comprise a particular class of fatty acids and fatty acid derivative compounds containing from about 8 to about 20 carbon atoms. Suitable fatty acids include stearic acid, linoleic acid and docasanoic acid which can be added to the phosphor powder as a liquid solution or dispersion preferably in methanol or water to provide a protective coating on the individual phosphor particles. In a different preferred embodiment, various solid derivatives of said fatty acids, including lithium, sodium, potassium, magnesium, and calcium metal salts can be directly admixed with the phosphor powder and preferably milled to afford the desired improved performance. The present additives greatly extend the useful life of x-ray intensifying screens and have been found even more effective than the protective additives disclosed in my aforementioned co-pending application Ser. No. 749,996. Accordingly, said protection not only improves moisture resistance but also resists polymer discoloration occurring in the phosphor layer of the fabricated x-ray screen after placement in physical contact with customary photographic film. Although the film speed loss attributable to such discoloration is reversible, as more fully explained in the continuation-in-part application Ser. No., filed, upon said aforementioned related application, it would be more advantageous to resist said discoloration from ever taking place. The increased protection is obtained by incorporating from a small but effective amount up to about 5% by weight of the present additives in the phosphor powder.

The class of rare earth oxyhalide phosphors which can be benefited with the present additives have the formula:

$LnOX{:}T_x$ wherein

Ln is one or more of La and Gd,

X is one or more of Cl and Br, and $T_x$ is one or more of $Tb^{3+}$ and $Tm^{3+}$ ion present at activator levels.

Activator levels can be present in conventional amounts which can vary both with respect to a particular single activator ion being employed as well as with coactivation employing both above identified activator ions.

BRIEF DESCRIPTION OF THE DRAWING

The drawing is a cross section of an enlarged view of a typical x-ray intensifying screen utilizing the present invention.

DETAILED DESCRIPTION OF THE INVENTION

The FIGURE shows an arrangement consisting of a double emulsion photographic film 9 which is sandwiched between two x-ray intensifying screens. The screens are constructed of a flexible backing member 5, a reflector layer 6, a phosphor layer 7 to which this invention relates and a transparent top layer 8. It is to be emphasized that the particular construction shown in the FIGURE is merely exemplary and is not intended to be a limitation on the invention. Rather, the invention resides in the preparation of the phosphor to render it moisture resistant as well as exhibiting improved retention of original film speed when employed in an x-ray screen construction. The following discussion will relate to the phosphor which will serve as a phosphor layer such as shown by 7 in the FIGURE.

In the preferred embodiments of the invention, the phosphor LaOBr is activated with thulium ($Tm^{3+}$) and/or terbium ($Tb^{3+}$). The following examples illustrate preferred methods for combining the present additives with the aforementioned phosphor materials in providing x-ray screens having improved moisture resistance and x-ray brightness.

EXAMPLE 1

A one-quart mill size phosphor formulation was prepared having the following constituents:

260 gm LaOBr: 0.003 Tm
75 gm Methyl ethyl ketone
75 gm Methanol
1.35 gm Magnesium stearate These constituents were milled for approximately one hour and 5 gm. tributyl phosphate along with 30 gm polyvinyl butyral polymer binder were then added to the blended slurry. Said phosphor slurry was milled for an additional four hours and filtered through a 250 mesh size screen for preparation of the coating layer 7 depicted in the accompanying drawing. The phosphor coating was applied with a doctor blade onto a 10 mil thickness mylar substrate and dried to provide a dry coating thickness of approximately 4 mils and wherein the phosphor admixture was adhesively bonded with the polymer binder used. A 0.3 mil thickness layer of transparent cellulose acetate butyrate was deposited on said phosphor layer as further depicted in the accompanying drawing.

EXAMPLE 2

Approximately 300 gm of a LaOBr: 0.003 Tm phosphor powder was washed in 500 ml methanol containing 1.35 gm magnesium stearate dispersed therein for about ½ hour, then filtered and dried. This treated phosphor was then prepared as an x-ray screen using the same method of preparation described in the preceding example.

MEASUREMENTS OF ACCELERATED HUMIDITY

In order to illustrate the moisture resistance obtained in accordance with both above examples, two ½-inch square screens incorporating the present additives were placed in a humidity chamber set at 100° C. and 100% relative humidity for accelerated testing conditions. Such exposure is considerably more severe than is encountered at the 20° C. and 50% relative humidity conditions experienced in air-conditioned x-ray rooms. Periodically the screens were removed, examined and read for brightness under x-ray excitation at 80 KV peak. The results are presented in Table I below which shows the number of hours for which the brightness was still 100% of original brightness for various additives incorporated by both of said illustrated methods.

TABLE I

| Example | Weight Percent Additive in Phosphor Admixture | Time at 100% Brightness |
|---|---|---|
| 3 | None | 1 hour |
| 4 | 0.5% Mg stearate (Example 1 method) | >64 hours |
| 5 | 0.5% Mg stearate addition + 2.5% $MgSO_4$ (Example 2 method) | >55 hours |
| 6 | 1.0% Mg stearate (Example 2 method) | >55 hours |
| 7 | 1% Stearic acid (Example 2 method) | >50 hours |
| 8 | .25% Mg stearate (Example 2 method) | >40 hours |
| 9 | 0.5% Na stearate (Example 1 method) | >30 hours |
| 10 | 0.5% Na oleate (Example 1 method) | > 4 hours |
| 11 | 1% Linoleic acid (Example 2 method) | >50 hours |
| 12 | 1% Docasanoic acid (Example 2 method) | >50 hours |

As can readily be calculated from the data in Table I, magnesium stearate improves the moisture resistance of LaOBr phosphors in x-ray screens by factors ranging between 40 to over 64. A lesser degree of improvement was demonstrated with the remaining additives.

FILM SPEED MEASUREMENTS

Other x-ray screens were constructed in the same general manner above described for examination of resistance to loss in film speed resulting from discoloration when the phosphor layer remained in continued physical contact with conventional photographic film. Accordingly, said screens were subjected to accelerated test conditions wherein film-screen pairs were placed in a humidity chamber being maintained at 50° C. and 90% relative humidity for a week during which time period the film was changed three times. Interim testing of the exposed film-screen pairs by x-ray brightness measurement in the same manner above described produced the results listed in Table II.

TABLE II

ORIGINAL BRIGHTNESS RETENTION OF FILM-SCREEN PAIRS

| Screen-Pair No. | Wt. % Additive | Days at 90% of Original Brightness |
|---|---|---|
| 6 | None | 4 |
| 7 | None | 3 |
| 8 | 1.0% Mg stearate | 7 |
| 9 | 3.0% Hexanoic Acid | 9 |
| 10 | 2.3% Octanoic Acid | 5 |

As can be readily determined from the Table II results, the resistance to discoloration and film speed loss which is imparted by the phosphor admixtures of the present invention significantly further extends screen life. While no direct comparison of said results with the x-ray brightness measurements reported in Table I above can be made by reason of the different test conditions involved it would still not be expected that greater brightness loss occurs from discoloration than is experienced from moisture attack. The protective action afforded in the foregoing manner further serves to maintain the original film speed or brightness when said phosphor admixtures are utilized in x-ray screens. Since the discoloration responsible for film speed or brightness loss has been observed to take place in the polymer binder constituent of the phosphor layer, it can be concluded therefrom that some form of chemical interraction otherwise occurring between the phosphor itself, if not protected, and the migration products in binder material has been prevented or at least retarded.

It should be understood that the invention is not limited to the exact details of construction shown and described herein for obvious modifications will occur to persons skilled in the art. For example, it is apparent from the foregoing preferred embodiments that physical combinations of the present additives with the inorganic salt additives disclosed in my aforementioned co-pending application Ser. No. 749,996 can serve to protect rare earth oxyhalide phosphors from still other forms of physical and chemical attack which degrade performance when these phosphors are utilized in x-ray screens. Additionally, it will be apparent from the embodiments illustrated that liquid dispersions as well as liquid solutions of the present additives can be used in treating the phosphor material. It is intended to limit the present invention, therefore, only by the scope of the following claims.

What I claim as new and desire to secure by Letters Patent of the United States is:

1. An improved x-ray screen including a backing member coated with a physical admixture of a rare earth oxyhalide phosphor according to the formula:

$LnOX{:}T_x$ wherein

Ln is La and/or Gd,

X is Cl and/or Br, and $T_x$ is $Tb^{3+}$ and/or $Tm^{3+}$ ion present at activator levels, with a fatty acid additive containing from about 8 to about 20 carbon atoms in sufficient quantity from a small but effective amount up to about 5 weight percent based on the phosphor weight to retain original emission brightness when utilized in said x-ray screen for a longer time period than for said phosphor without said additive, and with said phosphor admixture being adhesively bonded with a polymer binder to said backing member, and said improved x-ray screen resisting loss in film speed and brightness when associated with a photographic film.

2. The x-ray screen set forth in claim 1 wherein the phosphor is LaOBr.

* * * * *